(12) United States Patent
Han et al.

(10) Patent No.: US 12,503,625 B2
(45) Date of Patent: Dec. 23, 2025

(54) WELDING STRIP CARRIER FILM, PREPARATION METHOD THEREFORE, AND APPLICATION THEREOF

(71) Applicant: Cybrid Technologies Inc., Suzhou (CN)

(72) Inventors: Xiaohang Han, Suzhou (CN); Lei Wang, Suzhou (CN); Ya Zheng, Suzhou (CN); Hongye Chen, Suzhou (CN); Xiaoping Wu, Suzhou (CN)

(73) Assignee: Cybrid Technologies Inc., Suzhou (CN)

( * ) Notice: Subject to any disclaimer, the term of this patent is extended or adjusted under 35 U.S.C. 154(b) by 184 days.

(21) Appl. No.: 18/044,855

(22) PCT Filed: Dec. 25, 2020

(86) PCT No.: PCT/CN2020/139566
§ 371 (c)(1),
(2) Date: Mar. 10, 2023

(87) PCT Pub. No.: WO2022/057139
PCT Pub. Date: Mar. 24, 2022

(65) Prior Publication Data
US 2023/0374347 A1 Nov. 23, 2023

(30) Foreign Application Priority Data

Sep. 18, 2020 (CN) .......................... 202010986695.0

(51) Int. Cl.
*C09J 7/24* (2018.01)
*H10F 19/90* (2025.01)

(52) U.S. Cl.
CPC ............ *C09J 7/243* (2018.01); *H10F 19/906* (2025.01); *C09J 2203/322* (2013.01);
(Continued)

(58) Field of Classification Search
CPC .............. C09J 2203/322; C09J 2203/33; C09J 2301/16; C09J 2301/304; C09J 2301/41;
(Continued)

(56) References Cited

U.S. PATENT DOCUMENTS 4,048,378 A * 9/1977 Pelzek .................... B32B 27/36
428/522

FOREIGN PATENT DOCUMENTS

| CN | 102766412 A | 11/2012 |
| CN | 102786883 A | 11/2012 |

(Continued)

OTHER PUBLICATIONS

Translation of the Written Opinion from the International Searching Authority in PCT/CN2020/139566, Apr. 9, 2021 (Year: 2021).*

(Continued)

*Primary Examiner* — Lawrence D Ferguson
(74) *Attorney, Agent, or Firm* — Peter L. Brewer; Thrive IP

(57) ABSTRACT

A welding strip carrier film. The raw materials for the welding strip carrier film comprise, in percent by mass, 50-99% of a matrix resin, 0-50% of a tackifying resin, and 0-5% of an additive. The matrix resin is one or more of a polyolefin resin and an elastomer thereof, a polyester resin and an elastomer thereof, polyvinyl butyral, an ethylene-vinyl acetate copolymer, an ethylene-acrylic acid copolymer, an ionic polymer, polyamide, fluororesin, and modifiers thereof. The tackifying resin is one or more of rosin, hydrogenated rosin, a petroleum resin, a hydrogenated petroleum resin, a phenolic resin, and a terpene resin. The carrier film can be manufactured into a single-layer structure, and thus can have a support function while ensuring its (Continued)

bonding performance to a welding strip and a cell; and the carrier film would not be penetrated by a welding strip during lamination.

18 Claims, 1 Drawing Sheet

(52) U.S. Cl.
CPC ........ *C09J 2301/16* (2020.08); *C09J 2301/41* (2020.08); *C09J 2423/04* (2013.01)

(58) Field of Classification Search
CPC .... C09J 2423/04; C09J 2423/046; C09J 5/10; C09J 7/241; C09J 7/243; H10F 19/902; H10F 19/906; Y02E 10/50
See application file for complete search history.

(56) References Cited

FOREIGN PATENT DOCUMENTS

| | | | |
|---|---|---|---|
| CN | 103173145 | B | 6/2013 |
| CN | 103804774 | B | 5/2014 |
| CN | 105385369 | A | 3/2016 |
| CN | 105576046 | B | 5/2016 |
| CN | 106634702 | A | 5/2017 |
| CN | 106784103 | A | 5/2017 |
| CN | 206595263 | U | 10/2017 |
| CN | 107337848 | A | 11/2017 |
| CN | 107353847 | A | 11/2017 |
| CN | 206806349 | U | 12/2017 |
| CN | 208637438 | U | 3/2019 |
| CN | 208797008 | U | 4/2019 |
| CN | 110527466 | A | 12/2019 |
| CN | 111403498 | A | 7/2020 |
| CN | 111403528 | A | 7/2020 |

OTHER PUBLICATIONS

Machine Translation of Abstract in Application No. CN 102766412; Published Nov. 7, 2012; 1 page.
Machine Translation of Abstract in Application No. CN 102786883; Published Nov. 21, 2012; 1 page.
Machine Translation of Abstract in Application No. CN 103173145; Published Jun. 26, 2013; 1 page.
Machine Translation of Abstract in Application No. CN 103804774; Published May 21, 2014; 1 page.
Machine Translation of Abstract in Application No. CN 105385369; Published Mar. 9, 2016; 1 page.
Machine Translation of Abstract in Application No. CN 105576046; Published May 11, 2016; 1 page.
Machine Translation of Abstract in Application No. CN 106634702; Published May 10, 2017; 1 page.
Machine Translation of Abstract in Application No. CN 106784103; Published May 31, 2017; 1 page.
Machine Translation of Abstract in Application No. CN 107337848; Published Nov. 10, 2017; 1 page.
Machine Translation of Abstract in Application No. CN 107353847; Published Nov. 17, 2017; 1 page.
Machine Translation of Abstract in Application No. CN 110527466; Published Dec. 3, 2019; 1 page.
Machine Translation of Abstract in Application No. CN 111403498; Published Jul. 10, 2020; 1 page.
Machine Translation of Abstract in Application No. CN 111403528; Published Jul. 10, 2020; 1 page.
Machine Translation of Abstract in Application No. CN 206595263; Published Oct. 27, 2017; 1 page.
Machine Translation of Abstract in Application No. CN 206806349; Published Dec. 26, 2017; 1 page.
Machine Translation of Abstract in Application No. CN 208637438; Published Mar. 22, 2019; 1 page.
Machine Translation of Abstract in Application No. CN 208797008; Published Apr. 26, 2019 1 page.
First Office Action issued in Priority Application No. CN 202010986695.0; Issued: May 31, 2021; 13 pages.
Machine Translation of First Office Action issued in Priority Application No. CN 202010986695.0; Issued: May 31, 2021; 13 pages.
Second Office Action issued in Priority Application No. CN 202010986695.0; Issued: Nov. 16, 2021; 13 pages.
Machine Translation of Second Office Action issued in Priority Application No. CN 202010986695.0; Issued: Nov. 16, 2021; 14 pages.

\* cited by examiner

WELDING STRIP CARRIER FILM, PREPARATION METHOD THEREFORE, AND APPLICATION THEREOF

TECHNICAL FIELD OF THE INVENTION

The present invention relates to a welding strip carrier film, a preparation method therefor, and an application thereof.

BACKGROUND OF THE INVENTION

At present, the development tendency of modules in the photovoltaic industry is from three main grids to four main grids, five main grids, and recently developed into the current multi-busbar. In recent years, no-main grid modules have been proposed, which can save the consumption of silver and reduce the shielding of the grid line to the cells and improve the power generation efficiency, for example, in CN201720080886.4 electrodes interconnection structure of IBC battery, and in CN201710054876.8 Interconnecting process of N-type double-sided battery, by Taizhou Longji Solar, and in CN201720292907.9 No-main grid solar cell module, by Shenzhen Laplace Energy Technology Co., Ltd.

At present, there are two ways to fix the wire of the cell of the no-main-grid module on the cell:
1. through an electroplating process, such as CN201820959124.6 No-main grid double-sided plating metallized solar cell, Suzhou Taiyangjing New Energy Co., Ltd.;
2. through carrying the wire by a bonding film and fixing it on the cell during lamination, such as CN201510933299.0 Preparation method for no-main grid welding strip for solar cell, Huanhe Hydropower Photovoltaic Industry Technology Co., Ltd.

In addition, the bonding film in the prior art is usually a structure with two or more layers, a support layer and a bonding layer; the bonding layer provides the bonding force required to laminate the bonding film with the welding strip and the bonding force required to laminate the bonding film with the cell. However, during the encapsulation of PV modules, the bonding film employing a structure with two or more layers is prone to delamination in the connection between the support layer and the encapsulation material at high temperature; in addition, the multi-layer structure will inevitably make more components used in the bonding film, which in turn will have a great impact on the transmittance, refractive index and haze of the bonding film, high processing cost and high equipment cost.

SUMMARY OF THE INVENTION

The present disclosure is designed to provide a welding strip carrier film which can well bond a welding strip on a cell and has a simple structure, a preparation method therefor, and application thereof.

To achieve the above purpose, a technical solution employed by the present disclosure is:

An aspect of the present disclosure provides a welding strip carrier film, its raw material formula comprises, in percent by mass, 50 to 99% of matrix resin, 0 to 50% of tackifying resin, and 0 to 5% of additive; the matrix resin is selected from the group consisting of polyolefin resin and elastomers thereof, polyester resin and elastomers thereof, polyvinyl butyral (PVB), ethylene-vinyl acetate copolymer (EVA), ethylene-acrylic acid copolymer (EAA), an ionic polymer, polyamide, fluororesin, modifiers of the foregoing substances, and combinations thereof; the tackifying resin is selected from the group consisting of rosin, hydrogenated rosin, petroleum resin, hydrogenated petroleum resin, phenolic resin, terpene resin, and combinations thereof.

The various types of modifiers of the matrix resin in the present disclosure can be formed by modifications such as copolymerization, grafting of the matrix resin using other monomers (including but not limited to ethylene) or modifiers (including but not limited to silanes) on the basis of the matrix resin.

According to some specific and preferred implementations, the polyolefin resin includes, but is not limited to, one or more of polyethylene (PE), high-density polyethylene (HDPE), low-density polyethylene (LDPE), and linear low-density polyethylene (LLDPE).

According to some specific and preferred implementations, the polyolefin elastomers include, but are not limited to, one or more of OBC, POE, and POP.

According to some specific and preferred implementations, the polyester resin includes, but is not limited to, one or more of polyethylene terephthalate, polybutylene terephthalate, poly(diallyl terephthalate), and poly-p-hydroxybenzoate.

According to some specific and preferred implementations, the polyester elastomers include, but are not limited to, one or more of polyurethane elastomers, co-polyester elastomers containing polyether soft segments.

According to some specific and preferred implementations, the ionic polymer includes, but is not limited to, ionized polymers of polymer resins with sodium ions, potassium ions, etc.

According to some specific and preferred implementations, the polyamide includes, but is not limited to, one or more of polyamide-6 (PA6), polyamide-66 (PA66), and polyamide-1212 (PA1212).

In the present disclosure, the fluororesin includes, but is not limited to, one or more of polyvinyl fluoride (PVF), polyvinylidene fluoride (PVDF), and polytetrafluoroethylene (PTFE).

According to an implementation, the content of the tackifying resin is >0.

According to a preferred way of this implementation, the raw material formula of the welding strip carrier film comprises 50 to 95% of matrix resin, 0.1 to 50% of tackifying resin, and 0 to 5% of additive.

Further preferably, the raw material formula of the welding strip carrier film comprises 60 to 90% of matrix resin, 5 to 39% of tackifying resin, and 0.1 to 5% of additive.

More preferably, the raw material formula of the welding strip carrier film comprises 75 to 90% of matrix resin, 5 to 20% of tackifying resin, and 0.1 to 5% of additive.

According to another implementation, the content of the tackifying resin is 0, and at which point at least one of the matrix resin(s) is polar.

According to a preferred way of this implementation, the raw material formula of the welding strip carrier film comprises 95 to 99.9% of matrix resin, and 0.1 to 5% of additive.

Further preferably, the raw material formula of the welding strip carrier film comprises 95 to 99% of matrix resin, and 1 to 5% of additive.

Preferably, the additive comprises one or more of an initiator, a cross-linking agent, a silane coupling agent, a light stabilizer, an antioxidant, an ultraviolet light absorber, an antiblocking agent, a nucleating agent, a transparent agent, an anti-PID additive.

Preferably, the welding strip carrier film has a thickness of 20 μm to 500 μm.

Preferably, the welding strip carrier film has a transmittance of ≥80%, preferably ≥90%, in the wavelength band 380~1100.

Preferably, the welding strip carrier film is further provided with a release film on one side, and/or, the welding strip carrier film is embossed on one side.

In the present disclosure, the embossing is not limited to the embossing of patterns, but can be done in any way that causes the surface of the welding strip carrier film rough.

In the present disclosure, the release film or embossing is formed on a layer away from the welding strip, while the side in contact with the welding strip should be as smooth as possible.

Further preferably, the release film is a conventional release film, such as PE, PP, PET, etc., and the release film may be colored or colorless.

Preferably, the welding strip carrier film is cross-linked or non-cross-linked; when the welding strip carrier film is cross-linked, the welding strip carrier film has a pre-cross-linking degree of ≤60%, preferably the welding strip carrier film has different pre-cross-linking degrees on both sides.

Further preferably, when the welding strip carrier film is cross-linked, the matrix resin has a melting point or Tg temperature ≤150° C., and when the welding strip carrier film is non-cross-linked, the matrix resin has a melting point or Tg temperature ≥100° C.

In the present disclosure, the requirement of melting point or Tg temperature of the matrix resin used for cross-linked and non-cross-linked types means that at least some of the resin in the matrix resin needs to meet this requirement.

Further preferably, when the welding strip carrier film is cross-linked, the additive comprises an initiator, a cross-linking agent, a silane coupling agent, and one or more of a light stabilizer, an antioxidant, an ultraviolet light absorber, an antiblocking agent, a nucleating agent, a transparent agent, and an anti-PID additive; when the welding strip carrier film is non-cross-linked, the additive comprises one or more of an initiator, a silane coupling agent, a light stabilizer, an antioxidant, an ultraviolet light absorber, an antiblocking agent, a nucleating agent, a transparent agent, and an anti-PID additive.

More preferably, when the welding strip carrier film is non-cross-linked, the additive comprises a light stabilizer, an antioxidant, and an anti-PID additive in a mass ratio of (2~3):(0.5~1.5): 1; or, the additive is an initiator, a coupling agent, a light stabilizer, an antioxidant, and an anti-PID additive in a mass ratio of (0.5~1.5):(2~8):(2~3):(0.5~1.5): 1.

More preferably, when the welding strip carrier film is cross-linked, the additive comprises an initiator, a cross-linking agent, a coupling agent, a light stabilizer, an antioxidant, and an anti-PID additive in a mass ratio of 1:(1~3):(0.8~1.5):(0.5~1):(0.1~0.5):(0.1~1.5).

According to some specific and preferred implementations, the initiator includes, but is not limited to, one or more of trimethylolpropane tris-acrylate, di(trimethylolpropane) tetraacrylate, ethoxylated trimethylolpropane triacrylate, propoxylated trimethylolpropane triacrylate, ethyl 4-dimethylaminobenzoate, dicumyl peroxyide (DCP), 2,5-dimethyl-2,5-bis(tert-butylperoxy)hexane.

According to some specific and preferred implementations, the cross-linking agent includes, but is not limited to, one or more of tert-butylperoxy 2-ethylhexyl carbonate, tert-butyl peroxy isopropyl carbonate, dibenzoyl peroxide, dicumyl peroxide, 2,5-dimethyl-2,5-bis(tert-butylperoxy) hexane, cyclohexanone peroxide, tert-butyl hydroperoxide, tert-butyl peroxybenzoate, tert-butyl peroxyacetate, di-(4-tert-butylcyclohexyl) peroxydicarbonate, tert-butyl peroxy-3,5,5-trimethylhexanoate, triallyl isocyanurate (TAIC).

According to some specific and preferred implementations, the coupling agent includes, but is not limited to, one or more of 3-methacryloxypropyl methyl dimethoxysilane, 3-glycidoxypropyltrimethoxysilane, vinyl trimethoxysilane, 3-aminopropyltriethoxysilane, titanium triisostearoylisopropoxide, and isopropyl tri(dioctylpyrophosphate) titanate.

According to some specific and preferred implementations, the light stabilizer includes, but is not limited to, one or more of bis(2,2,6,6-tetramethyl-4-piperidyl) sebacate (light stabilizer 770), poly(4-hydroxy-2,2,6,6-tetramethyl-1-piperidine ethanol-alt-1,4-butanedioic acid), and poly[[6-[(1,1,3,3-tetramethylbutyl)amino]-1,3,5-triazine-2,4-diyl]-[(2,2,6,6-tetramethyl-4-piperidyl)imino]-hexamethylene-[(2,2,6,6-tetramethyl-4-piperidyl)imino].

According to some specific and preferred implementations, the antioxidant includes, but is not limited to, one or more of phenolic antioxidants, phosphite antioxidants, and hindered amine antioxidants.

According to some specific and preferred implementations, the anti-PID additive is a metal ion trap.

A second aspect of the present disclosure is to provide a preparation method for a welding strip carrier film mentioned above, which comprising blending, followed by tape casting, calendering or blow molding into a film, for a cross-linked carrier film, selectively employing electronic, atomic, ionic, neutron, thermal or electromagnetic irradiation to control the pre-cross-linking degree of the carrier film; preferably employing electronic or electromagnetic irradiation.

A third aspect of the present disclosure is to provide a welding strip composite comprising a welding strip carrier film mentioned above, and a welding strip adhered to the welding strip carrier film; preferably, for a cross-linked carrier film, the pre-cross-linking degree of the carrier film on the side in contact with the welding strip is less than the pre-cross-linking degree on the side away from the welding strip.

Preferably, at least 30% or more of the volume of the welding strip is exposed out of the welding strip carrier film to enable good contact between the welding strip and the cell while ensuring the bonding properties of the welding strip to the carrier film. Further preferably, 30% to 70% of the volume of the welding strip is exposed out of the welding strip carrier film, and more preferably, 40% to 60% of the volume of the welding strip is exposed out of the welding strip carrier film.

A fourth aspect of the present disclosure is to provide a cell composite comprising a cell, a welding strip in contact with the cell, and a carrier film for securing the welding strip to the cell, the carrier film being the welding strip carrier film mentioned above; preferably, the welding strip and the carrier film are provided on two sides of the cell.

Preferably, the cell is one of a crystalline silicon cell, an amorphous silicon cell, a chemical solar cell, a multi-compound thin film solar cell, etc.

A fifth aspect of the present disclosure is to provide a preparation method for a cell composite comprising the steps of:
(1) adhering a welding strip to carrier films by pressing at a controlled temperature of 50 to 200° C., with a controlled pressing time of 0.1 to 1 s and with two adjacent carrier films located on each side of the welding strip and spaced apart;

(2) cutting the welding strip to which the carrier films are adhered to form welding strip composite units, the welding strip composite units being consisting of the welding strip and two carrier films;

(3) pressing the welding strip composite units onto the surface of the cell at a controlled temperature of 50 to 300° C., and a controlled pressing time of 0.2 to 3 s; preferably, pressing welding strip composite units respectively on both sides of the cell.

Preferably, when the carrier film is provided with a release film, removing the release film before step (1) or after step (3).

A sixth aspect of the present disclosure is to provide use of the welding strip carrier film, or the welding strip composite, or the cell composite in a photovoltaic module.

Due to the use of the above technical solutions, the present disclosure has the following advantages over the prior art:

According to the present disclosure, by means of the optimization of the carrier film formula, the carrier film can be manufactured into a single-layer structure, and thus can have a support function while ensuring its bonding performance to a welding strip and a cell; and the carrier film would not be penetrated by a welding strip during lamination, and at the same time, only a single-layer structure also increases the compatibility with the encapsulation film. The carrier film of the present disclosure features a simple structure, low production costs, and low equipment costs. At the same time, by means of the improved process, the carrier film and the welding strip can be fixed quickly and stably, which is convenient for the lamination of the whole module in the next step.

Figure 1:
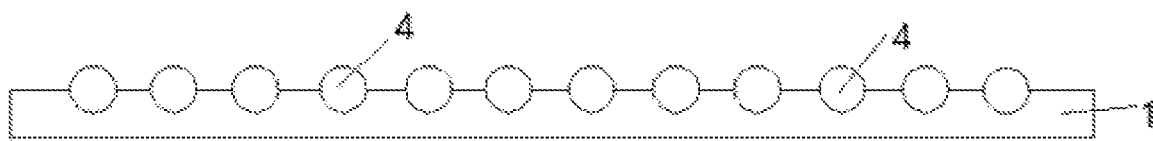
FIG. 1 is a schematic structure diagram of a welding strip composite formed by a carrier film.

Wherein, 1, carrier film; 4, welding strip; 5, cell.

DETAILED DESCRIPTION OF EXEMPLARY EMBODIMENTS

In the following, the present disclosure is further described combining with specific embodiments, but the present disclosure is not limited to the following embodiments. The implementation conditions used in the embodiments can be further adjusted according to different requirements of specific use, and undefined implementation conditions are conventional conditions in the industry. The parts of raw materials in the following embodiments and the comparative examples are all parts by mass.

Embodiment 1

1, The raw material formula of a carrier film 1 was: 50 parts of linear low-density polyethylene (LLDPE), and 30 parts of POE as matrix resin, 20 parts of hydrogenated petroleum resin, 0.5 parts of light stabilizer 770, 0.2 parts of antioxidant 1010, 0.2 parts of anti-PID additive; they were mixed well by a high-speed mixer and tape casted into an 80 μm film, with no need for release film, and can be embossed on one side or not as needed.

Figure 2:
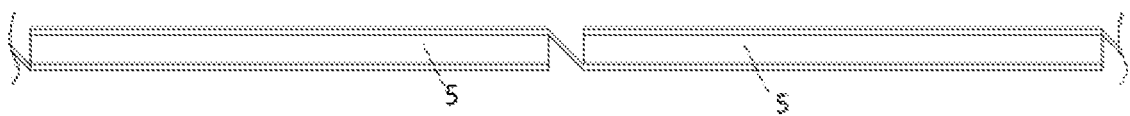
FIG. 2 is a schematic structure diagram of a cell composite.

2, Preparation of cell composite (1) The carrier film 1 prepared in step 1 was cut into the desired size;

(2) A plurality of welding strips 4 was adhered to the cut carrier films 1 in parallel by pressing at a controlled temperature under 110° C., with a controlled pressing time of 0.5 s, and two adjacent carrier films 1 were adhered to the upper and lower sides of the welding strips 4 and staggered so as to facilitate the bonding of the welding strips 4 to the cell 5;

(3) The welding strips 4 adhered with the carrier films 1 were cut in accordance with two carrier films 1 as one unit to form welding strip composite units;

(4) The cut welding strip composite units were pressed onto the surface of the cell 5 at a controlled temperature under 150° C., with a controlled pressing time of 1.5 s; the welding strips 4 were made to contact the cell 5 to fix the welding strips 4 on the surface of the cell 5 by the carrier films 1. One carrier film 1 on one welding strip composite unit was pressed onto the upper surface of one cell 5, another carrier film 1 was pressed onto the lower surface of a cell 5 adjacent to that cell 5, and the side of each cell 5 that was not pressed with carrier film 1 was pressed onto the carrier film 1 of another welding strip composite unit so that both sides of each cell 5 were pressed with the welding strip composite units, and the structure is shown in FIG. 2.

This embodiment is a non-cross-linked carrier film with a larger amount of LLDPE to enhance the overall temperature resistance and prevent the film from being pressed through by the welding strip when bonded to the welding strip.

Embodiment 2

1, The raw material formula of a carrier film 1 was: 50 parts of linear low-density polyethylene (LLDPE), and 40 parts of POE as matrix resin, 10 parts of hydrogenated petroleum resin, 0.2 parts of initiator 2,5-dimethyl-2,5-bis(tert-butylperoxy)hexane, 1 part of silane coupling agent vinyl trimethoxysilane, 0.5 parts of light stabilizer 770, 0.2 parts of antioxidant 1010, 0.2 parts of anti-PID additive; they were mixed well by a high-speed mixer and grafted in a twin-screw extruder at a grafting temperature of 180 to 250° C., and finally tape casted into an 80 μm film.

2, Preparation of cell composite (1) The carrier film 1 prepared in step 1 was cut into the desired size;

(2) A plurality of welding strips 4 was adhered to the cut carrier films 1 in parallel by pressing at a controlled temperature of 110° C., with a controlled pressing time of 0.5 s, and two adjacent carrier films 1 were adhered to the upper and lower sides of the welding strips 4 and staggered so as to facilitate the bonding of the welding strips 4 to the cell 5;

(3) The welding strips 4 adhered with the carrier films 1 were cut in accordance with two carrier films 1 as one unit to form welding strip composite units;

(4) The cut welding strip composite units were pressed onto the surface of the cell 5 at a controlled temperature of 150° C., with a controlled pressing time of 1.5 s; the welding strips 4 were made to contact the cell 5 to fix the welding strips 4 on the surface of the cell 5 by the carrier films 1. One carrier film 1 on one welding strip composite unit was pressed onto the upper surface of one cell 5, another carrier film 1 was pressed onto the lower surface of a cell 5 adjacent to that cell 5, and the side of each cell 5 that was not pressed with carrier film 1 was pressed onto the carrier film 1 of another welding strip composite unit so that both sides of each cell 5 were pressed with the welding strip composite units.

This embodiment is a non-cross-linked carrier film that increases the bonding ability between the film and the cell and the temperature resistance of the film itself by adding initiators and silane coupling agents, and at the same time, the matrix resin LLDPE is grafted and modified in a twin-screw extruder at a grafting temperature of 180 to 250° C., which can reduce the crystallinity of LLDPE, improve the transmittance of the film itself and reduce the haze.

Embodiment 3

1, The raw material formula of a carrier film 1 was: 80 parts of POE as matrix resin, 20 parts of hydrogenated petroleum resin, 0.6 parts of initiator 2,5-dimethyl-2, 5-bis(tert-butylperoxy)hexane, 1 part of cross-linking agent TAIC, 0.6 part of silane coupling agent vinyl trimethoxysilane, 0.5 parts of light stabilizer 770, 0.2 parts of antioxidant 1010, 0.2 parts of anti-PID additive; they were mixed well by a high-speed mixer and left for 4-8 h to ensure that the additives are completely absorbed by the resin, then tape casted into an 80 μm film, and finally, the film was subjected to electron beam irradiation to achieve a pre-cross-linking degree of 20% of the product, while further cross-linking was possible during the lamination process.

2, Preparation of cell composite (1) The carrier film 1 prepared in step 1 was cut into the desired size;

(2) A plurality of welding strips 4 was adhered to the cut carrier films 1 in parallel by pressing at a controlled temperature of 110° C., with a controlled pressing time of 0.5 s, and two adjacent carrier films 1 were adhered to the upper and lower sides of the welding strips 4 and staggered so as to facilitate the bonding of the welding strips 4 to the cell 5;

(3) The welding strips 4 adhered with the carrier films 1 were cut in accordance with two carrier films 1 as one unit to form welding strip composite units;

(4) The cut welding strip composite units were pressed onto the surface of the cell 5 at a controlled temperature of 150° C., with a controlled pressing time of 1.5 s; the welding strips 4 were made to contact the cell 5 to fix the welding strips 4 on the surface of the cell 5 by the carrier films 1. One carrier film 1 on one welding strip composite unit was pressed onto the upper surface of one cell 5, another carrier film 1 was pressed onto the lower surface of a cell 5 adjacent to that cell 5, and the side of each cell 5 that was not pressed with carrier film 1 was pressed onto the carrier film 1 of another welding strip composite unit so that both sides of each cell 5 were pressed with the welding strip composite units.

This embodiment is a cross-linked carrier film with a pre-cross-linking degree of 20% and a cross-linking degree of 73% after lamination, the melting point of the matrix resin is about 70° C., and the pre-cross-linking degree of 20% ensures that the film will not be pressed through when bonding with the welding strip, and the pre-cross-linking degree should not be too high to ensure the initial adhesion of the film to the welding strip and the cell.

Embodiment 4

1, The raw material formula of a carrier film 1 was: 60 parts of POE, and 40 parts of EAA as matrix resin, 0.6 parts of initiator 2,5-dimethyl-2,5-bis(tert-butylperoxy) hexane, 1 part of cross-linking agent TAIC, 0.6 part of silane coupling agent vinyl trimethoxysilane, 0.5 parts of light stabilizer 770, 0.2 parts of antioxidant 1010, 0.2 parts of anti-PID additive; they were mixed well by a high-speed mixer and left for 4-8 h to ensure that the additives are completely absorbed by the resin, then tape casted into an 80 μm film, and finally, the film was subjected to electron beam irradiation to achieve a pre-cross-linking degree of 20% of the product, while further cross-linking was possible during the lamination process.

2, Preparation of cell composite (1) The carrier film 1 prepared in step 1 was cut into the desired size;

(2) A plurality of welding strips 4 was adhered to the cut carrier films 1 in parallel by pressing at a controlled temperature of 110° C., with a controlled pressing time of 0.5 s, and two adjacent carrier films 1 were adhered to the upper and lower sides of the welding strips 4 and staggered so as to facilitate the bonding of the welding strips 4 to the cell 5;

(3) The welding strips 4 adhered with the carrier films 1 were cut in accordance with two carrier films 1 as one unit to form welding strip composite units;

(4) The cut welding strip composite units were pressed onto the surface of the cell 5 at a controlled temperature of 150° C., with a controlled pressing time of 1.5 s; the welding strips 4 were made to contact the cell 5 to fix the welding strips 4 on the surface of the cell 5 by the carrier films 1. One carrier film 1 on one welding strip composite unit was pressed onto the upper surface of one cell 5, another carrier film 1 was pressed onto the lower surface of a cell 5 adjacent to that cell 5, and the side of each cell 5 that was not pressed with carrier film 1 was pressed onto the carrier film 1 of another welding strip composite unit so that both sides of each cell 5 were pressed with the welding strip composite units.

This embodiment is a cross-linked carrier film with a pre-cross-linking degree of 20% and a cross-linking degree of 75% after lamination, the polar material EAA is used to replace the tackifying resin with a smaller molecular weight to ensure the initial adhesion of the welding strip to the cell while cooperating with the pre-cross-linking degree of 20% to ensure that the film will not be pressed through when bonded to the welding strip.

Comparison 1

1, The raw material formula of a carrier film 1 was: 100 parts of linear low-density polyethylene (LLDPE) as matrix resin, 0.5 parts of light stabilizer 770, 0.2 parts of antioxidant 1010, 0.2 parts of anti-PID additive; they were mixed well by a high-speed mixer and tape casted into an 80 μm film.

2, Preparation of cell composite (1) The carrier film 1 prepared in step 1 was cut into the desired size;

(2) A plurality of welding strips 4 was adhered to the cut carrier films 1 in parallel by pressing at a controlled temperature of 110° C., with a controlled pressing time of 0.5 s, and two adjacent carrier films 1 were respectively adhered to the upper and lower sides of the welding strips 4 and staggered; however, the carrier films 1 cannot be bonded to the welding strips 4;

(3) The welding strips 4 were bonded onto the cell 5 through the carrier films 1 at a controlled temperature of 150° C., with a controlled pressing time of 1.5 s; however, the carrier film 1 cannot be bonded to the cell 5.

This example is a non-cross-linked carrier film, a pure LLDPE film, without polar low-melting point resin or tackifying resin, which cannot achieve bonding of the welding strip and the cell.

Comparison 2

1, The raw material formula of a carrier film 1 was: 100 parts of POE as matrix resin, 0.5 parts of light stabilizer 770, 0.2 parts of antioxidant 1010, 2 parts of anti-PID additive; they were mixed well by a high-speed mixer and tape casted into an 80 μm film.

2, Preparation of cell composite
(1) The carrier film 1 prepared in step 1 was cut into the desired size;
(2) A plurality of welding strips 4 was adhered to the cut carrier films 1 in parallel by pressing at a controlled temperature of 110° C., with a controlled pressing time of 0.5 s, and the carrier films 1 were pressed through.

This example is a non-cross-linked carrier film, a pure POE film, with a melting point of 70° C., and the sample is pressed through by the welding strips when being bonded to the welding strips.

Comparison 3

1, The raw material formula of a carrier film 1 was: 80 parts of POE as matrix resin, 20 parts of hydrogenated petroleum resin, 0.5 parts of light stabilizer 770, 0.2 parts of antioxidant 1010, 0.2 parts of anti-PID additive; they were mixed well by a high-speed mixer and tape casted into an 80 μm film.

2, Preparation of cell composite
(1) The carrier film 1 prepared in step 1 was cut into the desired size;
(2) A plurality of welding strips 4 was adhered to the cut carrier films 1 in parallel by pressing at a controlled temperature of 110° C., with a controlled pressing time of 0.5 s, and the carrier films 1 were pressed through.

This example is a non-cross-linked carrier film, in which the matrix resin POE has a melting point of 70° C., and 20 parts of hydrogenated petroleum resin are added, and the sample is pressed through by the welding strips when being bonded to the welding strips.

Comparison 4

1, The raw material formula of a carrier film 1 was: 80 parts of POE as matrix resin, 20 parts of hydrogenated petroleum resin, 0.6 parts of initiator 2,5-dimethyl-2,5-bis(tert-butylperoxy)hexane, 1 part of cross-linking agent TAIC, 0.6 part of silane coupling agent vinyl trimethoxysilane, 0.5 parts of light stabilizer 770, 0.2 parts of antioxidant 1010, 0.2 parts of anti-PID additive; they were mixed well by a high-speed mixer and left for 4-8 h to ensure that the additives are completely absorbed by the resin, then tape casted into an 80 μm film, and finally, the film was subjected to electron beam irradiation to achieve a pre-cross-linking degree of 65% of the product, which is further cross-linked to 80% during the lamination process.

2, Preparation of cell composite
(1) The carrier film 1 prepared in step 1 was cut into the desired size;
(2) A plurality of welding strips 4 was adhered to the cut carrier films 1 in parallel by pressing at a controlled temperature of 110° C., with a controlled pressing time of 0.5 s, and two adjacent carrier films 1 were respectively adhered to the upper and lower sides of the welding strips 4 and staggered; however, the carrier films 1 cannot be bonded to the welding strips 4;
(3) The welding strips 4 were bonded onto the cell 5 through the carrier films 1 at a controlled temperature of 150° C., with a controlled pressing time of 1.5 s; however, the carrier film 1 cannot be bonded to the cell 5.

This example is a cross-linked carrier film, with a pre-cross-linking degree of 65%, and the pre-cross-linking degree is too high to achieve bonding of the welding strip and the cell.

The carrier films prepared in the above embodiments and comparisons were tested according to the following methods, and the test results are shown in Table 1.

The test and evaluation methods of the respective properties are as follows:
Shrinkage: GB/T13541-92;
Transmittance: IEC60664-1;
Haze: ISO14782;
Pre-cross-linking degree/cross-linking degree: solvent method (xylene reflux, 145° C., 5 h)
Bonding of the Welding Strip and the Cell: Visual Inspection

TABLE 1

|  | Pre-cross-linking degree (%) | Cross-linking degree (%) | Shrinkage (%) MD | Shrinkage (%) TD | Transmittance (%) 380-1100 nm | Haze (%) | Bonding with the welding strip | Bonding with the cell |
|---|---|---|---|---|---|---|---|---|
| Embodiment 1 | / | / | 0.47 | 0.13 | 90.4 | 2.95 | OK | OK |
| Embodiment 2 | / | / | 0.55 | 0.24 | 90.8 | 2.76 | OK | OK |
| Embodiment 3 | 20 | 73 | 1.72 | 0.93 | 91.1 | 1.33 | OK | OK |
| Embodiment 4 | 20 | 75 | 1.58 | 0.86 | 89.3 | 2.88 | OK | OK |
| Comparison 1 | / | / | 0.39 | 0.11 | 88.7 | 4.69 | Unable to bond | Unable to bond |
| Comparison 2 | / | / | 2.33 | 1.34 | 91.5 | 1.22 | The film is pressed through. | / |
| Comparison 3 | / | / | 2.19 | 1.08 | 90.6 | 1.43 | The film is pressed through. | / |
| Comparison 4 | 65 | 80 | 2.22 | 1.17 | 90.5 | 1.39 | Unable to bond | Unable to bond |

The embodiments described above are only for illustrating the technical concepts and features of the present disclosure, and are intended to make those skilled in the art being able to understand the present disclosure and thereby implement it, and should not be concluded to limit the protective scope of this disclosure. Any equivalent variations or modifications according to the spirit of the present disclosure should be covered by the protective scope of the present disclosure.

The invention claimed is:

1. A welding strip carrier film, wherein:
in its raw material formula, the welding strip carrier film comprises, in percent by mass, 50 to 99% of matrix resin, 0 to 50% of tackifying resin, and 0 to 5% of additive;
the matrix resin is selected from the group consisting of polyolefin resin and elastomers thereof, polyester resin and elastomers thereof, polyvinyl butyral, ethylene-vinyl acetate copolymer, ethylene-acrylic acid copolymer, an ionic polymer, polyamide, fluororesin, modifiers of the foregoing substances, and combinations thereof;
the tackifying resin is selected from the group consisting of rosin, hydrogenated rosin, petroleum resin, hydrogenated petroleum resin, phenolic resin, terpene resin, and combinations thereof; and
the welding strip carrier film further comprises a release film on one side, and/or the welding strip carrier film is embossed on one side.

2. The welding strip carrier film of claim 1, wherein the additive comprises one or more of an initiator, a cross-linking agent, a coupling agent, a light stabilizer, an antioxidant, an ultraviolet light absorber, an antiblocking agent, a nucleating agent, a transparent agent, and an anti-PID additive.

3. The welding strip carrier film of claim 2, wherein:
the welding strip carrier film has a thickness of 20 μm to 500 μm; and
the welding strip carrier film has a transmittance of ≥80% in the wavelength band 380~1100 nm.

4. The welding strip carrier film of claim 2, wherein:
the welding strip carrier film is cross-linked; and
the welding strip carrier film has a pre-cross-linking degree of ≤60%; or,
the welding strip carrier film is non-cross-linked.

5. The welding strip carrier film of claim 4, wherein:
when the welding strip carrier film is cross-linked, the matrix resin has a melting point or Tg temperature ≤150° C., and
when the welding strip carrier film is non-cross-linked, the matrix resin has a melting point or Tg temperature ≥100° C.

6. The welding strip carrier film of claim 4, wherein: when the welding strip carrier film is cross-linked, the additive comprises
an initiator,
a cross-linking agent,
a coupling agent,
one or more of a light stabilizer, an antioxidant, an ultraviolet light absorber, an anti-blocking agent, a nucleating agent, a transparent agent, and an anti-PID additive; and
when the welding strip carrier film is non-cross-linked, the additive comprises one or more of an initiator, a silane coupling agent, a light stabilizer, an antioxidant, an ultraviolet light absorber, an antiblocking agent, a nucleating agent, a transparent agent, and an anti-PID additive.

7. The welding strip carrier film of claim 1, wherein when the content of the tackifying resin is 0, at least one of the matrix resin(s) is polar.

8. The welding strip carrier film of claim 1, wherein, a preparation method for the welding strip carrier film comprises blending, followed by tape casting, calendering or blow molding into a film, and for a cross-linked carrier film, selectively employing electronic, atomic, ionic, neutron, thermal or electromagnetic irradiation to control the pre-cross-linking degree of the carrier film.

9. A welding strip composite, wherein,
in its raw material form the welding strip carrier film comprises, in percent by mass, 50 to 99% of matrix resin, 0 to 50% of tackifying resin, and 0 to 5% of additive;
the matrix resin is selected from the group consisting of polyolefin resin and elastomers thereof, polyester resin and elastomers thereof, polyvinyl butyral, ethylene-vinyl acetate copolymer, ethylene-acrylic acid copolymer, an ionic polymer, polyamide, fluororesin, modifiers of the foregoing substances, and combinations thereof;
the tackifying resin is selected from the group consisting of rosin, hydrogenated rosin, petroleum resin, hydrogenated petroleum resin, phenolic resin, terpene resin, and combinations thereof;
a welding strip is adhered to the welding strip carrier film; and
the welding strip carrier film further comprises a release film on one side, and/or the welding strip carrier film is embossed on one side.

10. The welding strip composite of claim 9, wherein at least 30% or more of the volume of the welding strip is exposed out of the welding strip carrier film; and/or
when the welding strip carrier film is cross-linked, a pre-cross-linking degree of the welding strip carrier film on the side in contact with the welding strip is less than a pre-cross-linking degree on the side away from the welding strip.

11. A cell composite, comprising:
a cell,
a welding strip in contact with the cell, and
a carrier film for securing the welding strip to the cell, the carrier film is a welding strip carrier film, in its raw material form the welding strip carrier film comprises, in percent by mass, 50 to 99% of matrix resin, 0 to 50% of tackifying resin, and 0 to 5% of additive;
the matrix resin is selected from the group consisting of polyolefin resin and elastomers thereof, polyester resin and elastomers thereof, polyvinyl butyral, ethylene-vinyl acetate copolymer, ethylene-acrylic acid copolymer, an ionic polymer, polyamide, fluororesin, modifiers of the foregoing substances, and combinations thereof;
the tackifying resin is selected from the group consisting of rosin, hydrogenated rosin, petroleum resin, hydrogenated petroleum resin, phenolic resin, terpene resin, and combinations thereof; and
the welding strip carrier film further comprises a release film on one side, and/or the welding strip carrier film is embossed on one side.

12. The cell composite of claim 11, wherein, the cell is one of a crystalline silicon cell, an amorphous silicon cell, a chemical solar cell, a multi-compound thin film solar cell, and/or
the welding strip and the carrier film are provided on two sides of the cell.

13. The cell composite of claim 11, wherein a preparation method for the cell composite comprises the steps of:
(1) adhering a welding strip to carrier films by pressing at a controlled temperature of 50 to 200° C., with a controlled pressing time of 0.1 to 1 second and with two adjacent carrier films located on each side of the welding strip and spaced apart;
(2) cutting the welding strip to which the carrier films are adhered to form welding strip composite units, the welding strip composite units consisting of the welding strip and two carrier films; and
(3) pressing the welding strip composite units onto the surface of the cell at a controlled temperature of 50 to 300° C., and a controlled pressing time of 0.2 to 3 seconds.

14. The cell composite of claim 13, wherein when the carrier film is provided with a release film, removing the release film before step (1) or after step (3).

15. A photovoltaic module, comprising a welding strip carrier film, in its raw material form the welding strip carrier film comprises, in percent by mass, 50 to 99% of matrix resin, 0 to 50% of tackifying resin, and 0 to 5% of additive;
the matrix resin is selected from the group consisting of polyolefin resin and elastomers thereof, polyester resin and elastomers thereof, polyvinyl butyral, ethylene-vinyl acetate copolymer, ethylene-acrylic acid copolymer, an ionic polymer, polyamide, fluororesin, modifiers of the foregoing substances, and combinations thereof;
the tackifying resin is selected from the group consisting of rosin, hydrogenated rosin, petroleum resin, hydrogenated petroleum resin, phenolic resin, terpene resin, and combinations thereof and
the welding strip carrier film further comprises a release film on one side, and/or the welding strip carrier film is embossed on one side.

16. The welding strip carrier film of claim 3, wherein, the welding strip carrier film has a transmittance of ≥90% in the wavelength band 380~1100 nm.

17. The welding strip carrier film of claim 4, wherein, the welding strip carrier film has different pre-cross-linking degrees on both sides.

18. The welding strip carrier film of claim 8, wherein, for a cross-linked carrier film, employing electronic or electromagnetic irradiation to control the pre-cross-linking degree of the carrier film.

* * * * *